United States Patent
Davenport et al.

(10) Patent No.: US 6,487,393 B1
(45) Date of Patent: Nov. 26, 2002

(54) METHOD FOR DATA EXCHANGE WITH A MOBILE ASSET CONSIDERING COMMUNICATION LINK QUALITY

(75) Inventors: David M. Davenport, Niskayuna, NY (US); Juan Lauger-Diaz, Erie, PA (US); Robert A. Gray, Erie, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/411,113

(22) Filed: Oct. 4, 1999

(51) Int. Cl.[7] .............................................. H04B 17/00
(52) U.S. Cl. ...................... 455/67.7; 455/445; 455/456
(58) Field of Search ........................ 455/62, 421, 422, 455/435, 436, 445, 456, 457, 556, 557, 423–426, 67.1, 67.4, 67.7, 440, 441, 466; 370/327, 329, 331, 332, 333, 341; 342/357.01, 357.06, 357.08, 357.09, 457; 701/201, 202, 212, 213, 214

(56) References Cited

U.S. PATENT DOCUMENTS

| | | |
|---|---|---|
| 3,601,602 A | 8/1971 | Smith |
| 3,944,986 A | 3/1976 | Staples |
| 4,711,418 A | 12/1987 | Aver et al. |
| 5,415,369 A | 5/1995 | Hungate |
| 5,511,749 A | 4/1996 | Horst et al. |
| 5,574,469 A | 11/1996 | Hsu |
| 5,682,139 A | 10/1997 | Pradeep et al. |
| 5,785,283 A | 7/1998 | Ehrenberger et al. |
| 5,793,842 A * | 8/1998 | Schloemer et al. .......... 455/445 |
| 5,826,198 A * | 10/1998 | Bergins et al. .............. 455/557 |
| 5,828,979 A | 10/1998 | Polivka et al. |
| 6,098,048 A * | 8/2000 | Dashefsky et al. .......... 455/456 |
| 6,366,792 B1 * | 4/2002 | Katsuki ....................... 455/572 |
| 6,381,455 B1 * | 4/2002 | Smolik ......................... 455/421 |
| 6,400,314 B1 * | 6/2002 | Krasner .................. 342/357.09 |
| 2001/0046870 A1 * | 11/2001 | Stilp et al. ................... 455/456 |

OTHER PUBLICATIONS

Chun Loo, Digital Transmission Through A Land Mobile Satellite Channel; IEEE Transactions On Communications; May 5, 1990, pp. 693–697; vol. 38, No. 5.

Jonathan P. Castro, Statistical Observations of Data Transmission Over Land Mobile Satellite Channels; IEEE Journal On Selected Areas In Communications; Oct., 1992, pp. 1227–1235; vol. 10, No. H.

* cited by examiner

*Primary Examiner*—Nay Maung
(74) *Attorney, Agent, or Firm*—Carl Rowold; David G. Maire; Beusse Brownlee Bowdoin & Wolter, P.A.

(57) ABSTRACT

A method for data exchange with a mobile asset including the step of comparing the quality of the communication link to a predetermined value prior to initiating the communication. Polling of a fleet of mobile assets may be scheduled by considering a map of the communication link quality along the route of the mobile assets. An optimal packet size may be selected for the data transfer by considering the quality of the communication link.

13 Claims, 2 Drawing Sheets

METHOD FOR DATA EXCHANGE WITH A MOBILE ASSET CONSIDERING COMMUNICATION LINK QUALITY

BACKGROUND OF THE INVENTION

This invention relates generally to a method for exchanging data, and more specifically to a method for exchanging data with a mobile asset, such as a train, to a fixed data center utilizing a wireless communication link.

The transmission of data over a radio frequency channel is well known in the art. There are several wireless communications systems that are commercially available, including both cellular and satellite based systems. It is also known that the. effectiveness of the transmission of data over such systems is dependent upon an appropriately high signal to noise ratio during the data transmission. While the transmission of voice information may be accomplished in the presence of noise in the communication link, the transmission of data will require a much cleaner signal in order to avoid the corruption of the data. Corrupted data may be retransmitted, thereby increasing the time and cost involved with the data transfer. When utilizing such systems on a mobile asset, such as a truck or a train, it is difficult to assure that a sufficiently high signal to noise ratio will be maintained throughout the entire duration of the data transmittal because changes of asset position relative to terrain and man-made obstacles will affect the radio frequency propagation channel characteristics.

Improved communications systems have been developed to address the need for reliable data transmission over a wireless network. For example, U.S. Pat. No. 5,826,198 issued on Oct. 20, 1998, to Bergins, et al., teaches an improved cellular telephone network containing a means for measuring the quality of the communications channel for insuring that data transmission is attempted only when the channel signal level is greater than a predefined value. Such systems increase the cost of the communication link, and they may function to inhibit communications without regard for other variables affecting the need for the data transmittal.

BRIEF SUMMARY OF THE INVENTION

Thus, there is a particular need for a method of transferring data from and to a mobile platform that will assure the efficient transmission of data. Described herein is a method of transferring data with a data center from a mobile asset moving along a route, the method comprising the steps of: determining a communication link quality for a plurality of segments along the route; determining the position of the mobile asset along the route; initiating operation of a communication link for data exchange with the mobile asset to the data center only when the communication link quality of the segment including the position of the mobile asset exceeds a predetermined value.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The limitations of the prior art are exacerbated when using a wireless communications system for transferring between a fleet of mobile assets, such as trucks or locomotives, and a centralized data center. The management of such assets depends upon the regular downloading of data from the mobile asset to the data center. If such data transmittals are interrupted or corrupted, the value of the centralized data center is reduced, and/or the cost of the transmission of the data is increased. Moreover, as the size of the fleet of mobile assets grows, it becomes increasingly important to schedule the downloading of data from the various mobile assets in order to avoid an overload of the communication link. For example, if each mobile asset were programmed to download data at noon each day, the channels of communication into the data center would become quickly overloaded. Alternatively, various mobile assets may be programmed to download data at specified times in order to stagger the download schedule throughout the day. However, such a system may fail because a given asset may be in a region of poor communication quality at its scheduled communication time, thereby resulting in the loss of data for that day. Similar problems may result if the operator of each mobile asset were given discretion with regard to when the data transfer would occur.

The inventors have recognized that for satellite and cellular based communications links, the quality of the communication link will remain essentially constant over time for a particular location within the territory of the communications system. For example, on a railroad system there are known and fixed obstructions that adversely effect the quality of a communications link. Such obstructions may include tunnels, hills, buildings, trees, etc. Because such obstructions remain essentially constant, the inventors have found it advantageous to generate a map of the quality of the communication link that may be used to facilitate efficient communication with trains travelling over the railroad system.

Figure 1:
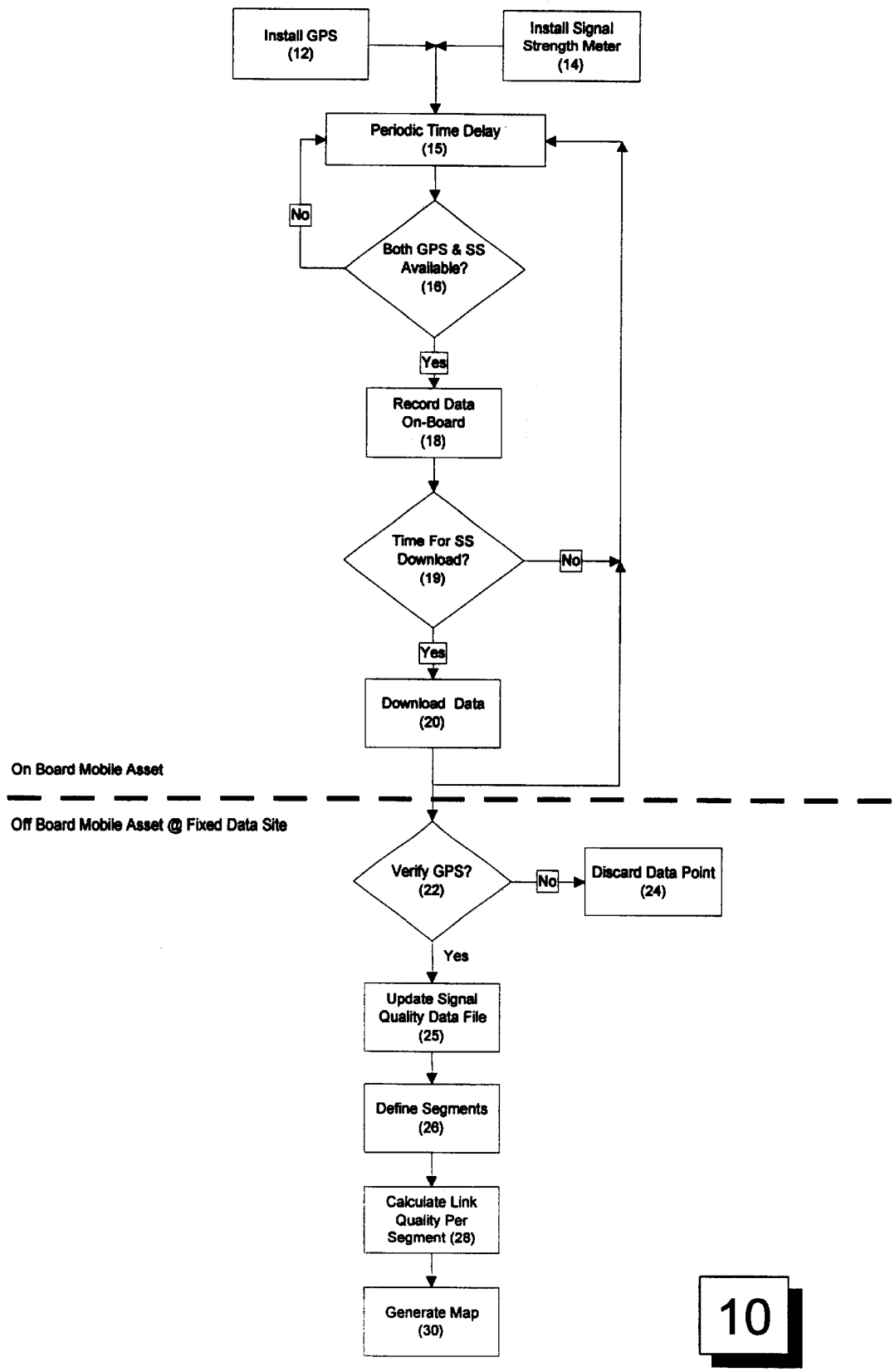
FIG. 1 is a process block diagram of a method of generating a map of the signal quality of a communications link.

FIG. 1 illustrates a method 10 for mapping the quality of a communication link over the route of a mobile asset. The communication link may be a cellular phone system, satellite based communications system, or other wireless communication system. To create such a map, a global positioning indication system (GPS) is installed 12 on one or more mobile assets. In addition, a means for measuring a communication link quality is also installed 14 on each such mobile asset. Such a means for measuring a communication link quality may be as simple as a signal strength meter of a cellular telephone, or it may be a more sophisticated instrument measuring specific parameters of the line-of-sight signal and shadow signals. The mobile asset(s) is/are then propelled along the route, such as moving a train along the rail lines of a railway system. Following a periodic time delay 15, measurements of communication link quality and the position of the mobile asset are then gathered 16. The time delay may be predetermined, for example at least once every ten minutes, or may be a function of the speed of travel of the asset, or may be another calculated interval. Such data may be recorded only when both the signal quality and position signals are available 16, since it is the correlation of signal quality to location along the route that provides the useful information. Such data is recorded 18 on-board the mobile asset, such as by storing the data on the hard drive of a computer on-board a train locomotive. The data may then be downloaded 20 at periodic intervals to an off-board database. More than one mobile asset may be used to collect the data in order to reduce the time needed for the data collection, or to obtain data for conditions that may vary from one mobile asset to another. The validity of the GPS readings may be verified off-board, and the GPS validity information may be recorded along with the GPS location entry. If it is determined that one or more of the GPS location entries is invalid 22, the communications link quality data associated with such GPS location entry may be discarded from the data base 24. Data verified to be accurate, including updated data or data from additional geographic areas obtained at later times, is then used to update a signal quality data file, as shown as step 25 of FIG. 1.

The signal quality data file may be analyzed and the results displayed for use in any variety of ways. For example, it may be useful to manipulate the signal quality data to define 26 a plurality of segments that represent geographic areas having communication link quality data within a predetermined range within each segment. One may imagine that the signal quality from a satellite communications link would fluctuate very little as a train passes across the Great Plains portion of the United States due to the relatively flat terrain and lack of tunnels and other obstructions. In such geographic areas, a single segment may be defined as being dozens of miles long. For each segment, a representative value for the communication link quality may be calculated 28. Such a representative value may be any one of many known statistical measures, such as mean, average, mu, sigma, etc. A map of the communication link quality may then be generated 30 utilizing either the raw signal quality data or the representative signal quality data for each segment. If the communication link quality differs significantly between assets or for other reasons, such as for example at different times of the day, the map may reflect such variables or a common map may be prepared to encompass all such variables.

Figure 2:
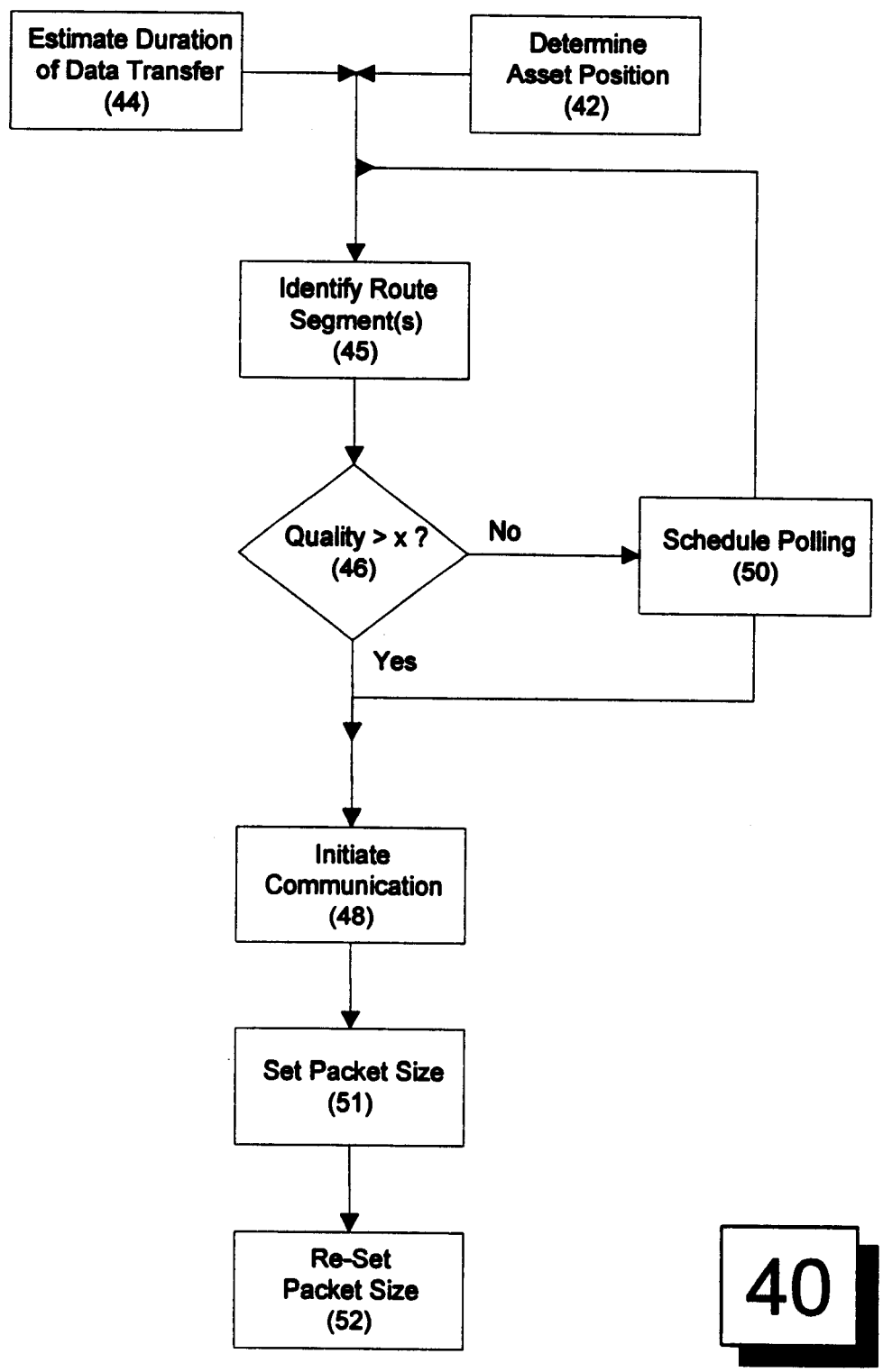
FIG. 2 is a process block diagram of a method for transmitting data through a communication link with consideration given to the quality of the communication link for determining when the communication is initiated and for determining the size of the data packets to be transmitted.

Once a communication link quality map is available for a particular route used by a fleet of mobile assets, such information may be utilized to improve the effectiveness of the transmission of data between mobile assets and a centralized data center. FIG. 2 illustrates such an improved method 40 for transferring data. The location of a mobile asset may be determined 42, either by automatic means, such as a GPS transponder or other sensors located along the route of the mobile asset, or by operator action. It is also possible to estimate 44 the expected duration of a data transfer. Such an estimate may be based on the amount of data to be transmitted and an expected data transfer rate, or the estimate may be an arbitrarily assigned conservative value. By knowing the position of the asset and its direction of travel, it is possible to identify (45) the segment or segments of the communication link quality map from FIG. 1 in which the asset will be located during the planned data transfer. For example, if the time required to download data is anticipated to be five minutes, only a single segment may be involved in areas where the size of the segments is very large. Alternatively, if the mobile asset is nearing a border of a segment or is located in a geographic area of small segments, it is possible that the mobile asset may pass through several different segments of the communication link quality map during the data transfer interval. The quality of the communication link in the segment or segments through which the asset will pass during the data transfer may be compared to a pre-determined value, as illustrated in step 46 of FIG. 2. If the communication link quality exceeds the predetermined value, communication between the mobile asset and the centralized data base may be initiated 48. If the communication link quality is below the predetermined value, the data transfer is not initiated.

It is possible to schedule the polling of a mobile asset for a time period in the future when the mobile asset is expected to be located in a segment having a sufficiently high communication quality. Such scheduling 50 may include consideration of the expected itinerary of the asset, the cost for communication time at various times of the day, arbitrary deadlines for the transfer of data, and the number and location of other mobile assets communicating through the same communication link. For example, in one embodiment a fleet of locomotives travelling over a railway system may be required to transmit data to a centralized data center at least daily in order to plan the maintenance schedule for the locomotives, and in order to generate statistics indicative of the efficiency of operation of the fleet. A wireless communication link such as the mobile satellite services provided by American Mobile Satellite Corporation or TMI Communications and terminal hardware such as that of Westinghouse Wireless Solutions may be installed on each locomotive in the fleet. The railway system includes a fixed track route for which a map of the quality of the communication link has been prepared in accordance with the method illustrated in FIG. 1. A program may be prepared to schedule 50 the polling of the various locomotives so that each locomotive is polled at least once daily, and no more than one locomotive is polled at a given time. The program contains the communication link quality information, the planned itinerary of each locomotive, and the position of each locomotive at a given time. Each locomotive is then individually contacted from the central data center at a time when the train is in a section of the railway where the quality of the communication link is adequate to assure high quality data transfer during the duration of the data transfer. The position of the locomotives may be updated periodically to allow the program to recalculate the polling schedule in the event of delays or other changes in the expected itineraries. A decisional rule base may be incorporated into the program to optimize the quality of the data transfer and/or to reduce the total cost of the use of the data link.

Once communication has been initiated 48 between the mobile asset and a fixed location via a communication link, the size of the data packets used to download the data may be selected, as is known in the art of digital communications. The quality of the communication link in the segment or segments of the asset during the data transfer may be considered to determine the optimal packet size. The optimal packet size is that size which maximizes the data transfer throughput by increasing the ratio of data-to-overhead bits while reducing the number of error corrupted packets requiring retransmission. As the quality of the communication link is improved, the optimal data packet size will increase, since there is a lower probability of data corruption and, therefore, the need to retransmit a packet. The packet size may be set 51 at the initiation of a communication interval, however, it may also be reset 52 following the completion of a portion of the information transfer, such as after an individual file or predetermined quantity of data bytes. This may be particularly useful for data transmissions requiring a long duration in a geographic area containing rapidly changing communication link quality levels.

Thus, prior knowledge of a mobile asset's position and velocity may be used in conjunction with a communications link quality data base to dynamically schedule future data retrieval sessions and to calculate a transfer function having an optimal packet size efficiency. Such a method is operable with a variety of communications technologies, and is particularly adapted for use with wireless communications systems. By considering the communication link quality as a function of the current and future location of a mobile asset, the efficiency of data transfer may be improved considerably when compared to prior art methods.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of data exchange with a mobile asset moving along a route, the method comprising;
   determining the quality of a respective communication link for each of a plurality of segments along the route;
   determining the position of the mobile asset along the route;
   initiating operation of the communication link for data transfer with the mobile asset only when the communication link quality in the segment including the position of the mobile asset exceeds a predetermined value.

2. The method of claim 1, further comprising:
   determining a duration of communication necessary for the data transfer;
   identifying all segments that will include the position of the mobile asset within the duration of communication;
   initiating the operation of the communication link only when the communication link quality of all segments that will include the position of the mobile platform during the duration of communication exceed a predetermined value.

3. The method of claim 1, wherein determining a quality of a communication link further comprises:
   installing a global positioning system on the mobile asset;
   installing a sensor measuring the communication link quality on the mobile asset;
   recording communication link quality data as a function of location at a plurality of locations as the mobile asset moves along the route to define a file of signal quality data.

4. The method of claim 3, further comprising:
   manipulating the measured location and link quality data to define the plurality of route segments; and
   processing the measured location and link quality data to establish a communication link quality for each route segment.

5. The method of claim 1, further comprising selecting a packet size for the data transfer as a function of the communication link quality of the segment in which the mobile asset is located.

6. A method of data exchange with a mobile asset moving along a route, the method comprising:
   determining a communication link quality for each of a plurality of segments along the route;
   determining the segment in which the mobile asset is located;
   initiating the operation of a communication link for data transfer with the mobile asset; and
   selecting the packet size for the data transfer as a function of the communication link quality for the segment in which the mobile asset is located.

7. The method of claim 6, further comprising scheduling the step of initiating the operation of a communication link for a time when the communication link quality of the segment in which the mobile asset is located is above a predetermined value.

8. The method of claim 6, further comprising re-setting the packet size for the data transfer following the completion of a portion of the data transfer.

9. A method of scheduling the polling of a plurality of mobile assets over a communication link, the method comprising:
   defining a plurality of geographic segments, each segment having a quality associated with a communication link;
   scheduling the polling of a plurality of mobile assets for data transfer to occur via the communication link for each asset in a segment having communication link quality above a predetermined value.

10. The method of claim 9, wherein the step of defining a plurality of geographic segments comprises:
    installing a global positioning system and a sensor for measuring the communication link quality on a mobile asset;
    recording the communication link quality as a function of location at a plurality of locations to define a file of signal quality data;
    dividing the data into segments having signal quality data that is within a predetermined range within each segment; and
    calculating a representative value for the communication link quality for each segment.

11. A method of mapping the quality of a communication link over a route of a mobile asset, the method comprising:
    installing a global positioning system on a mobile asset;
    installing a sensor for measuring a communication link quality on the mobile asset;
    recording on-board the mobile asset the communication link quality as a function of location at a plurality of locations as the mobile asset moves along a route to define a file of signal quality data;
    transferring the file to an off-board database; and
    analyzing the database to generate a map of the communication link quality over the route.

12. The method of claim 11, wherein the step of analyzing further comprises:
    dividing the route into segments having communication link quality data that is within a predetermined range within each segment;
    calculating a representative value for the communication link quality for each segment.

13. The method of claim 11, wherein the mobile asset comprises a first mobile asset and the file of signal quality data comprises a first file of signal quality data, and further comprising:
    installing a global positioning system on a second mobile asset;
    installing a means for measuring a communication link quality on the second mobile asset;
    recording on-board the second mobile asset the communication link quality as a function of location at a plurality of locations as the second mobile asset moves along a route to define a second file of signal quality data; and
    transferring the second file to the off-board database.

* * * * *